United States Patent

Mitchell et al.

[11] Patent Number: 6,049,341
[45] Date of Patent: Apr. 11, 2000

[54] EDGE CYCLE COLLISION DETECTION IN GRAPHICS ENVIRONMENT

[75] Inventors: Donald P. Mitchell; Michael D. Marr, both of Bellevue, Wash.

[73] Assignee: Microsoft Corporation, Redmond, Wash.

[21] Appl. No.: 08/953,629

[22] Filed: Oct. 20, 1997

[51] Int. Cl.[7] .................................................. G06T 15/00
[52] U.S. Cl. ........................ 345/473; 345/958; 345/959
[58] Field of Search ................................... 345/419, 473, 345/420, 421, 433, 425, 441, 959, 958; 364/461, 464

[56] References Cited

U.S. PATENT DOCUMENTS

| | | | |
|---|---|---|---|
| 4,823,272 | 4/1989 | Inselberg | 364/461 |
| 5,515,489 | 5/1996 | Yaeger | 345/473 |
| 5,572,634 | 11/1996 | Duluk, Jr. | 345/419 |

OTHER PUBLICATIONS

"A Representation Scheme for Rapid 3D Colision Detection", Bonner et al. (IEEE, Sep. 1989, pp 320–325), Aug. 1989.

Antonio, Franklin (Qualcomm, Incorporated, Del Mar, California), Faster Line Segment Intersection, Graphics Gems III, IV.6, Kirk, © 1992 by Academic Press, Inc., pp. 199–202.

*Primary Examiner*—Mark K. Zimmerman
*Assistant Examiner*—KimBinh T. Nguyen
*Attorney, Agent, or Firm*—Ronald M. Anderson

[57] ABSTRACT

A collision of a moving object with another object in a 3D virtual world is efficiently determined in real time so that the technique is usable over a network. An object in the 3D virtual world is projected onto a 2D plane. The projection of the object is bounded by a two-sided edge cycle that is formed from a sequence of line segments having endpoints that are consecutively joined at an ordered series of vertices. One side, which is formed by a counterclockwise ordering of the line segments and their respective vertices, is characterized as "front facing." The other side is characterized as "back facing." Additionally, the front and back facing characterization of a side of the edge cycle is determined by the disposition of the moving object, i.e., the closest side of the edge cycle to the moving object is its back facing side. A path line segment is developed for the projection of a path of a moving object onto the 2D plane, and a path line equation is determined for the path line segment. The path line equation is employed to identify any positive to negative sign transition between consecutive vertices of a front facing line segment of the edge cycle. An edge cycle line equation is then evaluated with the endpoints of the path line segment for the moving object to determine if the path line segment has intersected the line segment of the edge cycle during a particular time period.

21 Claims, 12 Drawing Sheets

EDGE CYCLE COLLISION DETECTION IN GRAPHICS ENVIRONMENT

FIELD OF THE INVENTION

The present invention generally relates to detecting interactions between moving objects in an image, and more specifically, in a three-dimensional (3D) graphics environment, detecting a collision between a moving object and another object.

BACKGROUND OF THE INVENTION

A computer game often includes a plurality of graphic image backgrounds that portray a virtual world in which objects move in accordance with the machine instructions comprising the game's software. Typically, the movement of at least one of the objects in a displayed image for the computer game is controlled by a user. When a collision event for the moving object is detected, the game reacts to the event in a defined manner. The moving object may, for example, comprise a spaceship firing weapons at attacking invaders or a character jumping about so that falling rocks or other hazards may be avoided. An avatar is another type of object that the user may move in a 3D virtual world environment (VWE), such as a chat room, for interaction with other avatars controlled by other users. In each of these examples, any time the moving object collides with any other object in a virtual world or gaming environment, it may be necessary to detect the collision event so that a predefined response or action can be performed.

The computational speed of a single computer that implements a display of a VWE is readily enhanced by increasing the computer's hardware resources, such as increasing memory and/or processor speed, so that collisions between objects in the environment may be detected in real time. Unlike a VWE that is solely implemented by a single computer, graphic images in a networked VWE are simultaneously implemented on a plurality of computers for display to multiple users. Although, the Internet network provides a relatively slow communication path between networked computers, it is a popular medium to interconnect computers that simultaneously display a virtual world to enable a number of users to interact. In a networked virtual world, the detection of collisions between moving objects is not as readily optimized with hardware enhancements because of the inherent latency of communications over the network. It is thus important for a collision detection technique in a networked VWE to be relatively computationally efficient so that between interconnected computers, unacceptably long delays in detecting and responding to a collision event may be avoided.

The projection of the path of a moving 3D object onto a two-dimensional (2D) surface is a well known geometric technique that is commonly performed prior to determining if an object has collided with another object, so that the number of computations necessary to detect a collision is reduced. In one prior art technique described by Antonio in "Graphics Gems III," the projected image of each object on the 2D surface is bounded by a series of straight line segments, and another straight line segment is projected onto the 2D surface along the path that the moving object is traveling. Significantly, Antonio treats each line segment that bounds the image of the object as a separate entity. At predefined intervals of time, computations are made for each line segment surrounding an object to determine if the line segment defining the path of the moving object has intersected the computed line segment. If a collision occurs between the selected time intervals at which the check is made, the collision will not be detected. Also, the two special cases of a path line segment overlaying an object line segment or the path line segment intersecting the vertex between two consecutive object line segments are not considered by this prior art technique. Moreover, Antonio's technique requires at least six multiplicative steps each time it is employed. Thus, Antonio's technique for detecting collisions between objects is too unreliable, and requires too many computations (six multiplication steps) to be usable in a networked 3D VWE.

In another prior art technique, the special case of a moving object that collides with a corner (vertex) formed by the two endpoints of two sequential line segments that encircle an object's projection into 2D space is solved. However, the solution is inefficient because each endpoint that forms the vertex is separately calculated. Significantly, two floating point calculations performed by a computer for the same nominal position (vertex) in a 3D VWE may provide two slightly different values due to rounding. These rounding differences can cause problems in handling collisions. For example, in the popular 3D computer game "Doom" by ID Software, Inc., when a player's character collides with a corner formed by two walls, the character sometimes slips through a "crack" at the corner formed by the walls. The crack is created by a difference in the two floating point calculations determined for the individual endpoints of the two line segments (walls) that form the corner. At corners, Doom determines if a collision between the center point of the moving character and the first wall has occurred, which includes determining the value of the vertex formed by a first endpoint and a second endpoint at the corner. If a collision is not detected, Doom next determines if the center point has collided with the second wall, again determining the value of the vertex formed by the first and second endpoints. Since the same vertex formed by the two endpoints is calculated twice, slight differences in the two calculated values can create a crack that allows the center point of the moving object to pass through and crash the game's software. Although Doom's detection of collisions between moving objects is computationally efficient, this prior art solution is not sufficiently robust for reliable implementation in a networked VWE.

In summary, prior art collision detection techniques are unsuitable for use in a networked 3D VWE. Accordingly, an approach is required that reduces the number of computations necessary to detect collisions between objects, implicitly handles special case conditions, and detects collisions whenever they may occur in a frame rendering time interval.

SUMMARY OF THE INVENTION

In accord with the present invention, a method is defined for detecting a collision between a first object that is moving and a second object, in a graphics environment effected with a computer. The method includes the step of extending a plurality of joined line segments in an ordered sequence, forming an edge cycle around a projection of the second object onto a plane. Successive line segments are joined at vertices that are ordered around the edge cycle, each line segment being characterized as either back facing or front facing relative to the first object, as a function of a direction of the ordered sequence of the line segments around the projection. A path of the first object is projected onto the plane as a path line segment extending in a direction along which the first object is moving. The path line segment is employed to determine a path line equation that defines a path of the first object. Using the path line equation, the vertices of the edge cycle are classified to indicate a side of the path on which each vertex is disposed. Any line segment of the edge cycle that is potentially intersected by the path line segment is identified, by detecting consecutive vertices of the edge cycle that when classified, were found to be on different sides of the path. For each line segment that is potentially intersected by the path line segment, an edge cycle line equation is generated. The method then determines whether the path line segment actually intersects the line segment that is potentially intersected as a function of endpoints of the path line segment and of the edge cycle line equation. Intersection of the line segment by the path line segment indicates that the first moving object has collided with the second object.

Other aspects of the present invention are directed to a system and to an article of manufacture. Each of these other aspects is generally consistent with the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 16:
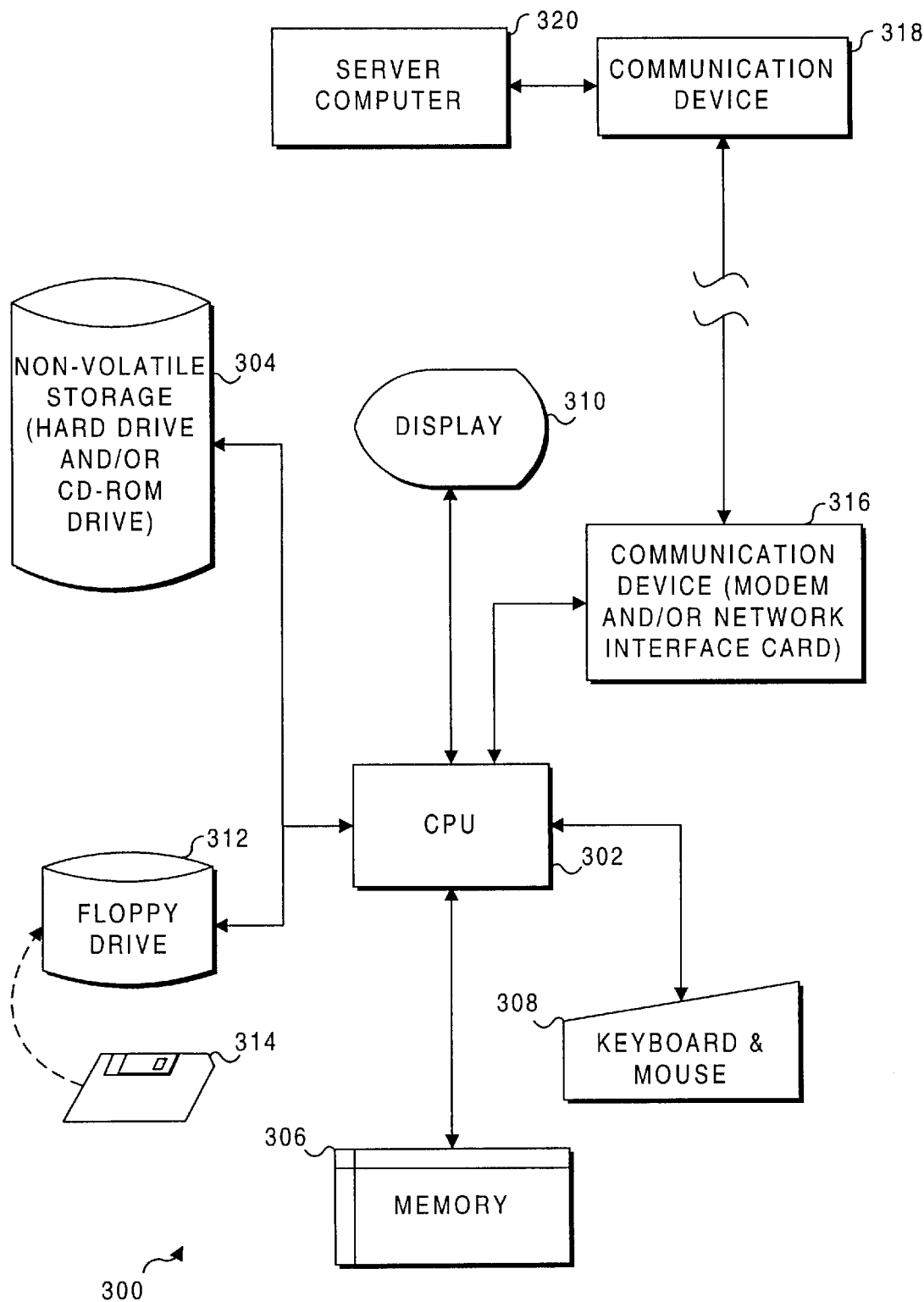
FIG. 16 is a block diagram illustrating an exemplary digital computer system suitable for executing the present invention, either as a server computer or as a client computer.

It is contemplated that the present invention be incorporated in any software program that renders a VWE (VWE), such as games and chat rooms, and be used in any graphics environment program where similar edge detection problems exist. These programs and the functions implemented to carry out the present invention are executed on digital computers, such as an exemplary digital computer 300, which is illustrated by a simple block diagram in FIG. 16. Digital computer 300 may comprise any personal desktop computer, laptop/notebook computer, work station, or other digital computer that includes a central processing unit (CPU) 302, a memory 306, a keyboard and optionally a mouse (or other pointing device) 308, a display 310, an optional floppy drive 312, and a nonvolatile storage 304 for programs and data, such as a hard drive and preferably a compact disk-read only memory (CD-ROM). Further, digital computer 300 may incorporate a communication device 316, such as a modem, integrated services digital network (ISDN) adapter, or a network interface card (NIC) for high speed data exchange with another communication device 318 that is coupled to a server computer 320. The server computer includes similar components to those in digital computer 300. Further details of the computers are not required to fully disclose the present invention, since such devices are generally well known to those of ordinary skill in the art.

Typically, an application that incorporates the present invention would be loaded in nonvolatile storage 304, i.e., onto the hard drive of computer 300, from a computer readable media such as a floppy disk 314 that is inserted into floppy drive 312. Alternatively, the machine instruction that cause the CPU to execute the present invention may be distributed on other types of computer readable non-volatile storage media, such as CD-ROMs, magnetic cassettes, flash memory cards, digital video disks (DVDs), Bernoulli cartridges, random access memories (RAMs), read only memories (ROMs), and the like. When the program comprising these machine instructions is to be executed, the machine instructions are loaded into memory 306, which includes both read only memory (ROM) and random access memory (RAM) (not separately shown). The machine instructions, once loaded into RAM, can be executed by CPU 302. The user provides input and controls the application being executed using the keyboard and/or mouse or other pointing device.

If the software program employs a networked client-server architecture to implement the program, server computer 320 will be used to download a VWE to a large number of individual client computers so that objects selected by the user or rendered by the program are presented on display 310. The user views and manipulates the objects, e.g., by adding, deleting, or moving the objects within the VWE. The present invention detects a collision between a moving object and another object within only a portion of the VWE that is required to define the entire VWE on the basis that the remainder of the VWE that is outside the perception of a user (i.e., not affected by the moving object manipulated by the user) is not of any consequence. Thus, collisions may be determined within the portion of the VWE with which the moving object interacts.

Figure 17:
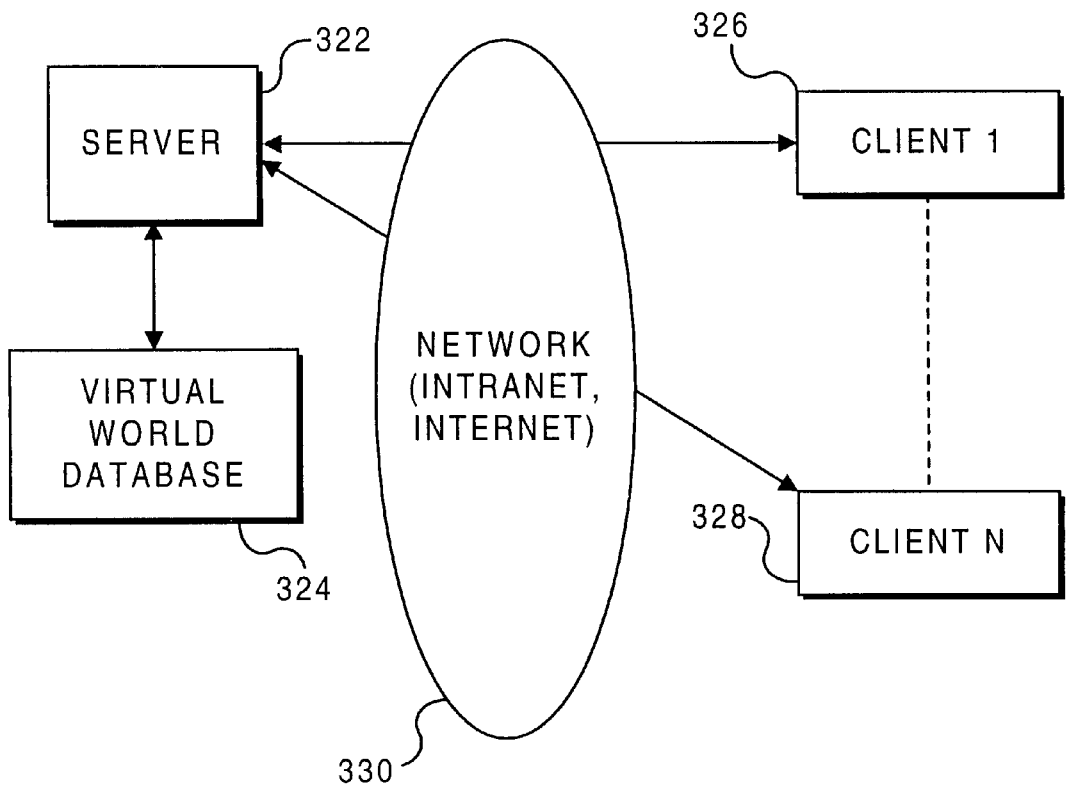
FIG. 17 is an exemplary view of a client-server architecture with a server computer coupled through a network to n client computers.

Referring now to FIG. 17, an exemplary block diagram of a client-server architecture for a VWE is illustrated. In the following description, the term "server" is used interchangeably with the term "server computer" and the term "client" is used interchangeably with the term "client computer." A server 322 continuously maintains a virtual world database 324, which contains the most up-to-date version of the entire VWE. A first client 326 through an $n_{th}$ client 228 is shown coupled to server 322, to indicate that an indeterminate number of other clients can be coupled to the server for interaction in the VWE.

Additionally, the server and the clients can be positioned remotely from each other, communicating over a network 330 such as the Internet, an intranet, or other communication link, to exchange data. Further, the server can actually comprise a network of distributed servers to scale resource capacity as necessary to efficiently administer the world database. The use of distributed servers to administer the virtual world database would thereby provide dynamic scaling of resources to match the number of users enjoying the VWE, so that the resources of the server and client, and of the network can be more efficiently employed. Although the preferred embodiment employs networked computers, such as client-server, to implement the VWE, the present invention may also be used with a single computer that implements a VWE for a single user.

In the present invention, the VWE is a graphically rendered environment that may comprise a plurality of objects. Typically, there are four types of objects: rooms, avatars, artifacts, and portals. A room is a discrete location or "area of interest" in which all communication between other objects at that location is contained. An avatar is a graphical object that represents a user's presence in the VWE and can be disposed within a room or a portal. An artifact is a graphical representation of an object, such as a container, a tool, a document, or a weapon, that is disposed within a room and can be observed, carried, and wielded by an avatar or associated with another artifact. Thus, artifacts can contain other artifacts, e.g., a box might contain a book and a can. Lastly, a portal is a "doorway" that links rooms together so as to enable the movement of avatars and/or artifacts between the rooms. Movement by an avatar between two rooms occurs when the avatar enters a portal from one room and exits the portal into another room.

In the prior art, significant computational resources are used to reliably determine in real time when a 3D object, such as an avatar, collides with another 3D object. The present invention employs several optimizations to reduce the computational resources necessary to detect collisions between 3D objects. The first optimization provides for projecting each 3D object within an area of interest into an x-y (2D) plane so that the number of space coordinates for each 3D object is reduced by a third i.e., the three dimensional (x, y, z) coordinates are converted by the projection step into two dimensional (x, y) coordinates. The projections are encircled with an edge cycle that is defined by a sequence of line segments. A collision is detected by determining if a line segment of an edge cycle is intersected by another line segment that represents the direction of travel (or path) of the center point of a moving object.

FIGS. 1–4 are a functional block diagram of the logic flow of the preferred embodiment. Moving from a start block, the logic steps to a block 102, which provides that a 3D object is projected onto a 2D plane. The logic moves to a block 104 in which the projection of the 3D object is enclosed with a plurality of (n) line segments that define an edge cycle, each line segment having a first and a second vertex $\{(X_i, Y_i), (X_{i+1}, Y_{i+1}), i=1 \text{ to } n\}$. Edge cycles are two-sided and formed by a sequence of straight line segments that are joined at a series of vertices so that the projection of a 3D object onto a 2D plane is completely enclosed. One side of the edge cycle is characterized as a "front facing" edge cycle, which is formed by a counterclockwise ordering of the sequence of line segments and their respective vertices. The other side of the edge cycle is characterized as a "back facing" edge cycle, for which the ordering of the sequence of the line segments and their respective vertices is clockwise.

Additionally, the front and back facing characterizations of an edge cycle are determined by the disposition of the starting point for a moving object. For example, relative to an object that is moving outside of an edge cycle around the 2D projection, the side disposed along the outside of the edge cycle is front facing, and the side disposed along the inside is back facing. Alternatively, if the moving object is moving within the 2D space enclosed by the edge cycle, the side disposed within the inside of the edge cycle is front facing, and the side disposed about the outside is back facing. In the preferred embodiment, only the front facing side of the edge cycle is employed to determine if a moving object has collided with another object. Thus, the back facing side and the front facing side of the edge cycle are defined by the ordering (direction) of the vertices for each 2D projection and relative to the disposition of the moving object.

In the preferred embodiment, the value of the first vertex of the first line segment equals the value of the second vertex of the nth line segment $(X_{n+1}=X_1, Yn+1=Y_1)$, because the first vertex for each line segment is identical to the second vertex of a sequentially ordered adjacent line segment. The preferred embodiment of the present invention enables the user to define the number (n) of line segments that will be employed to enclose a projection of a 3D object. In its simplest form, an edge cycle may be a single line segment, and the closeness of the fit of the line segments to the boundary of a 2D projection is generally directly proportional to the number of segments employed for the edge cycle. However, increasing the number of edge cycle line segments used also increases the computational resources needed to detect a collision in real time. Thus, the user of the present invention may reduce the computational resources required by decreasing the precision of a determination, i.e., limiting the number of line segments that are employed to form an edge cycle.

In a block 105, the convexity of the edge cycle is determined. If the value of each internal angle formed by the edge cycle line segments is less than or equal to 180 degrees, the edge cycle will be identified as convex. However, if at least one of the internal angles is found to be greater than 180 degrees, the edge cycle will be designated as non-convex. Moving to a block 106, the path of the center point $(X_0, Y_0)$ of a moving 3D object is projected onto the x-y (2D) plane. A block 108 provides that a line segment for the path of the moving object having a velocity $(V_x, V_y)$ may be determined for a given period of time (t). A path line segment is defined by a pair of endpoints $\{P=(X_0,Y_0), Q=(X_1,Y_1)$ where $X_1=X_0+tV_x$ and $Y_1=Y_0+tV_y\}$. The path line segment indicates the displacement of the moving object that has occurred during a particular frame rendering time interval, t, so that faster objects have long path line segments and slower objects have relatively shorter path line segments. The logic advances to a block 110 in which a continuous path of the moving object is defined by a line equation $\{AX+BY+C=0\}$. Since the path line segment is projected onto the 2D plane, a path line equation may be determined to represent a continuous line for the path line segment as proven by Theorem 1 below.

Theorem 1

$P(X_0,Y_0)$, $Q(X_1,Y_1)$ where P and Q are the first and second endpoints, respectively, of a line segment that defines the path of the center point of a moving object during a time interval.

$$Y_1 - Y_0 = M(X_1 - X_0), \ M = \frac{Y_1 - Y_0}{X_1 - X_0}$$

$$Y - Y_0 = \left(\frac{Y_1 - Y_0}{X_1 - X_0}\right)(X - X_0)$$

$$(Y_1 - Y_0)X + (X_0 - X_1)Y + (X_1Y_0 - X_0Y_1) = 0$$

∴ $A=(Y_1-Y_0)$, $B=(X_0-X_1)$, $C=(X_1Y_0-X_1Y_1)$, and $AX+BY+C=0$ is a transcendental line equation that defines a continuous line for the line segment having endpoints P and Q.

Figure 1:
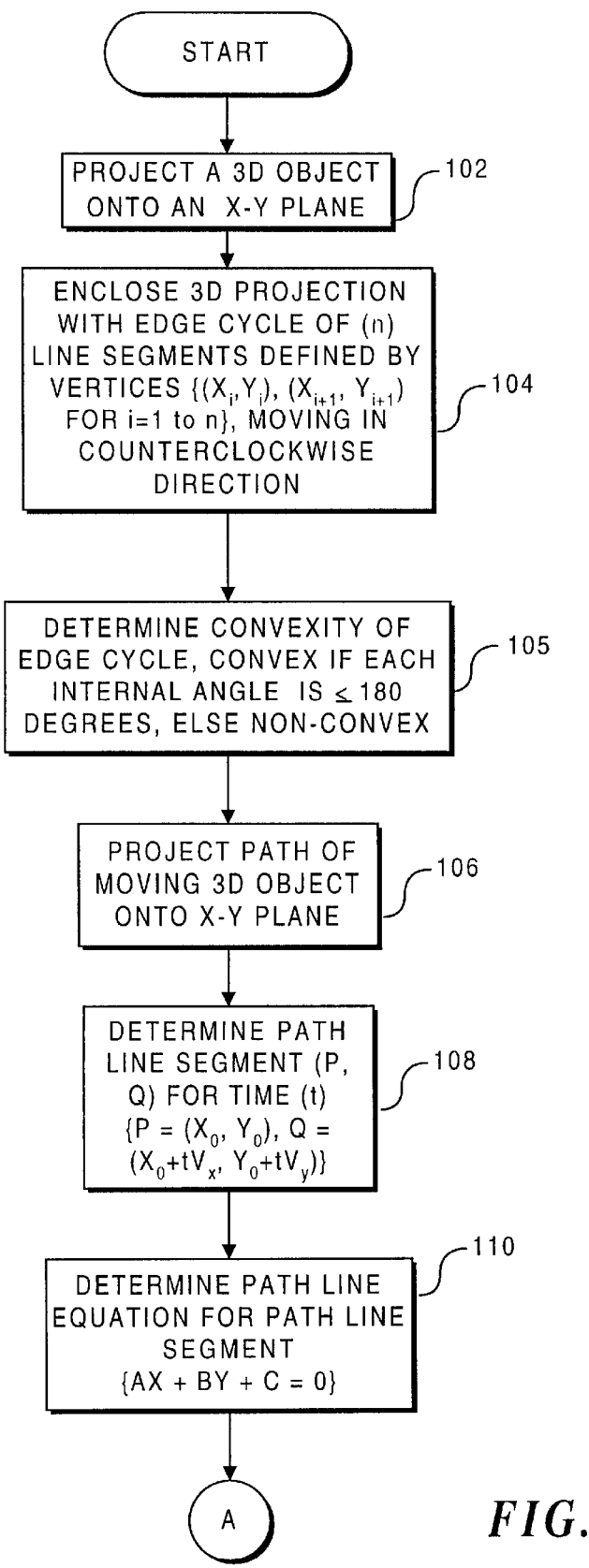
FIGS. 1–4 are a functional block diagram illustrating the logic flow of the preferred embodiment.
Figure 2:
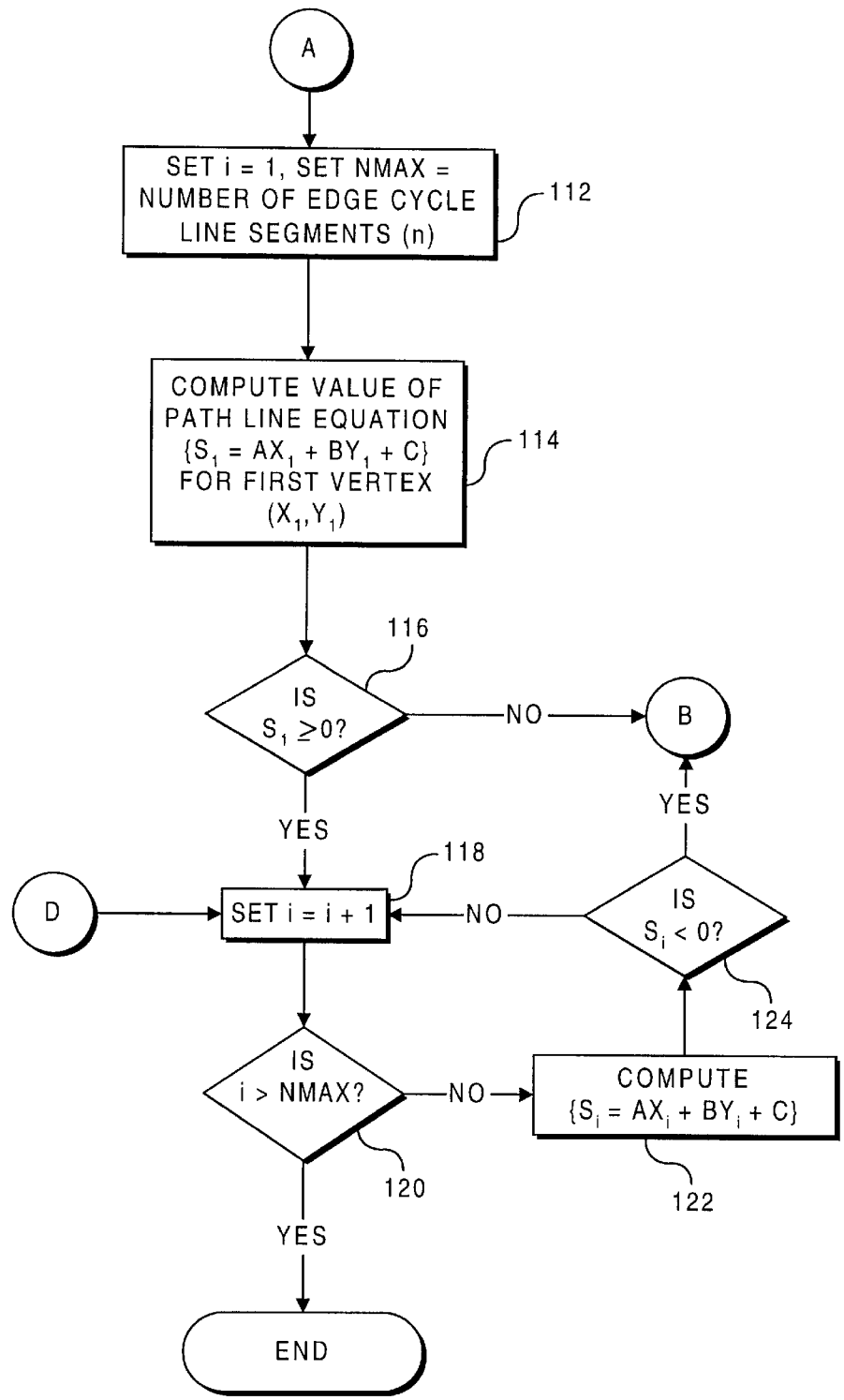

Turning now to FIG. 2, in a block 112, the value of a variable (i) is set to one and the value of a variable NMAX is set equal to n. In a block 114, a value for the line equation ($S_i=AX_i+BY_i+C$) is evaluated for a first vertex (i=1) of a front facing (counterclockwise) edge cycle. The value of the first vertex ($X_1,Y_1$) for the line equation ($S_1=AX_1+BY_1+C$) is stored. Whenever the path line equation is employed to calculate a value for a vertex of the edge cycle, the value is stored so that the preferred embodiment determines a value for each vertex of an edge cycle only once during a given time interval. It is an important aspect of the present invention that adjacent line segments of an edge cycle "share" a value for each vertex with the next sequential line segment. In the special case of the center point of the moving object intersecting a vertex of an edge cycle, the object cannot slip through a "crack" at a corner of the edge cycle because two slightly different floating point values have been calculated for the same vertex. Since only one value is determined for each vertex of an edge cycle that is checked for a collision, the preferred embodiment automatically reduces the demand on computational resources and increases the reliability of collision detection.

A decision block 116 provides for determining whether the value of the line equation ($S_1$) is greater than or equal to zero. If true, the logic advances to a block 118, and the value of the variable i is incremented by one. Significantly, the logic at decision block 116 checks two different states when evaluating the value of $S_1$. If the value of $S_1$ is greater than zero (first state), the first vertex is assigned a positive sign and the moving object is determined to not intersect this particular vertex of the edge cycle because it is disposed above the line defined by the path line equation. Further, if the value of $S_1$ is equal to zero (second state), the line represented by the path line equation is determined to be passing through the first vertex of the edge cycle.

Next, a decision block 120 determines whether the variable i has a value greater than NMAX. If true, the logic steps to an end block and the moving object is determined to have not collided with the edge cycle, i.e., with the object having a projection enclosed by the edge cycle. If false, the logic moves to a block 122 and the value of the path line equation ($S_i$) is evaluated for the next counterclockwise vertex ($X_i,Y_i$) of the front facing edge cycle. The procedure advances to a decision block 124 to determine whether the value of the path line equation ($S_i$) is less than zero. If not, the logic loops back to block 118, and the variable i is incremented by one. The logic will loop until decision block 120 determines that the variable i is greater than NMAX or a negative value for the path line equation ($-S_i$) is evaluated at decision block 124. Moreover, if the value of every vertex evaluated with the path line equation is found to have a positive sign, the object is implicitly determined to be positioned above the path of the moving object.

Figure 3:
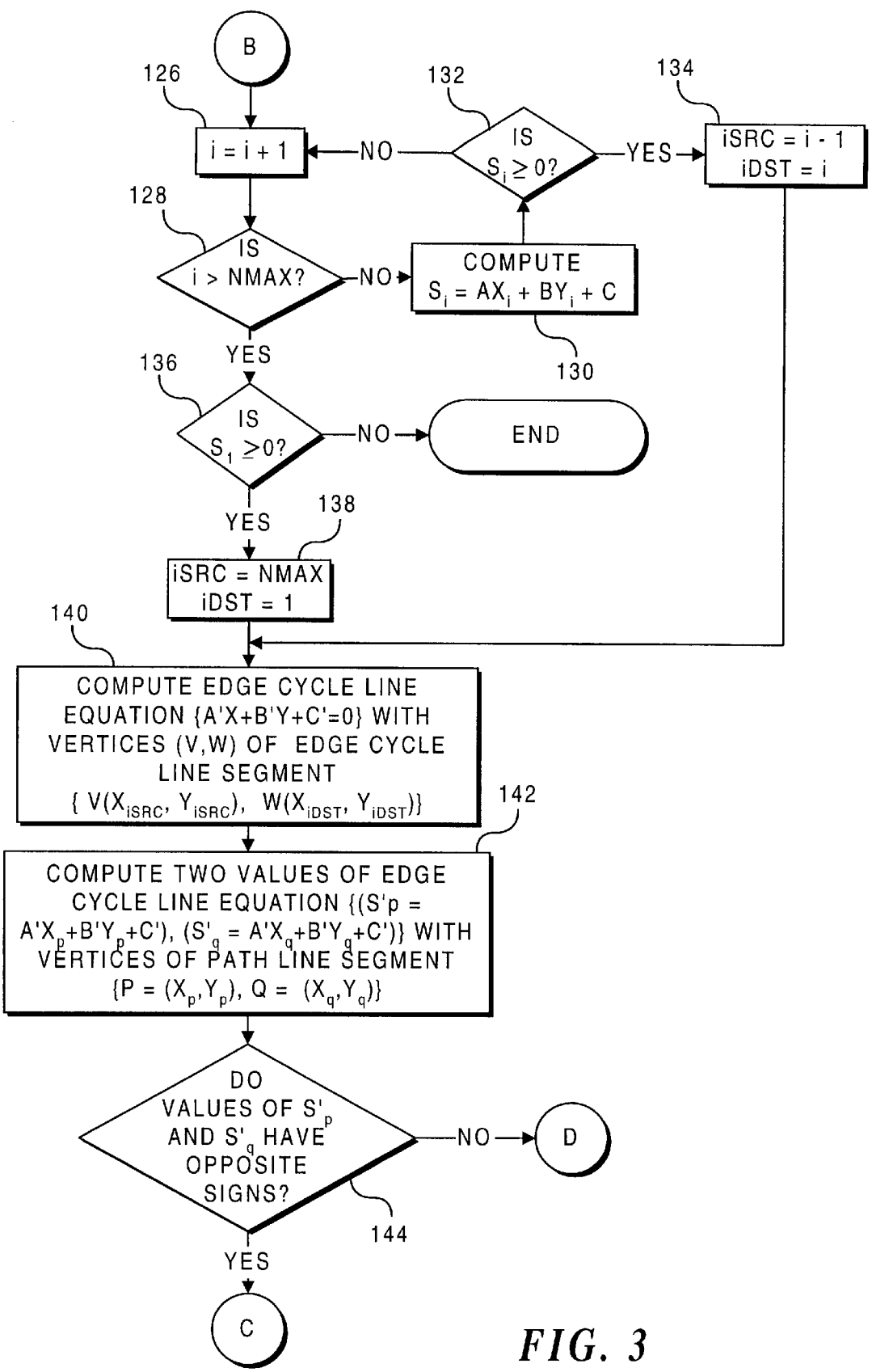
Figure 4:
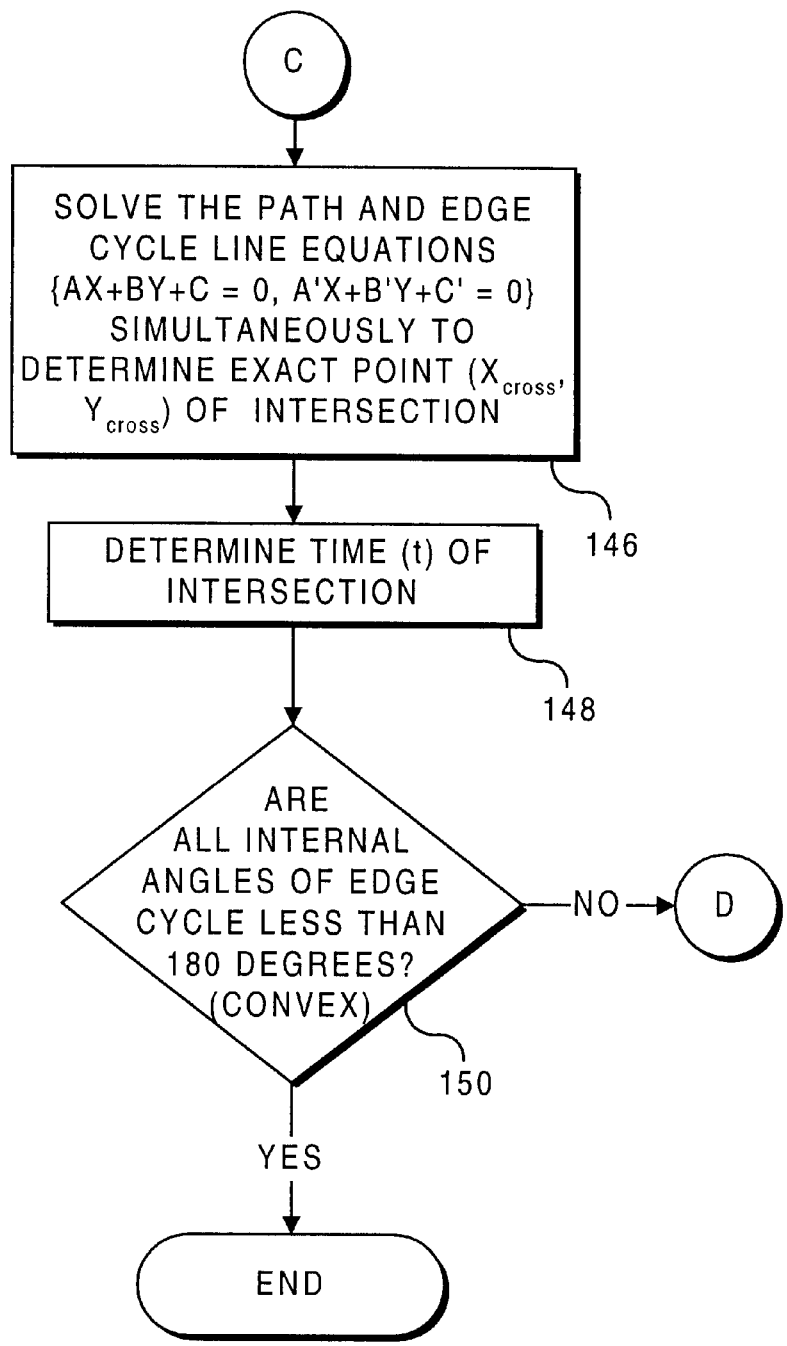

If the evaluation at decision block 124 is true or is false at decision block 116, the logic advances to a block 126 as shown in FIG. 3. At block 126, the variable i is incremented by one. A decision block 128 determines if the variable i has a value greater than NMAX. If false, the logic moves to a block 130 where the value of the path line equation ($S_i= AX_i+BY_i+C$) for the next counterclockwise vertex of the edge cycle is evaluated. A decision block 132 determines whether the value of the path line equation ($S_i$) is greater than or equal to zero. If false, the logic loops to block 126 so that variable i may again be incremented by one. The procedure continues looping until the determination at decision block 128 or decision block 132 is true. If the logic evaluated at decision block 128 is true, then all of the edge cycle vertices have been evaluated by the path line equation and the results of the evaluations have been stored. A decision block 136 determines whether the value of the path line equation for the first vertex was greater than or equal to zero. If false, the logic moves to an end block and the moving object is determined to have not collided with the object having the edge cycle. Additionally, if every value of the vertices evaluated with the path line equation is found to be negative, then the object having the edge cycle is implicitly determined to be disposed below the path of the moving object.

If the evaluation at decision block 136 is true, the logic moves to a block 138 and the value of a variable (iSRC) is set equal to NMAX, and another variable (iDST) is set equal to 1. The logic steps to a block 140 and a line equation ($A'X+B'Y+C'=0$) is calculated for an edge cycle line segment, where the first and second endpoints (V, W) are defined by a pair of consecutive counterclockwise vertices, respectively. The first endpoint V corresponds to a negatively determined vertex and the second endpoint W corresponds to another vertex determined to have a value that is positive or equal to zero, the sign of each vertex having been previously determined with the path line equation.

However, if at decision block 132, the value of the path line equation ($S_i$) was determined to be greater than or equal to zero, the logic would have advanced to a block 134. The variable iSRC would be set equal to the value of the variable i minus one. Further, the value of the variable iDST would be set equal to the value of the variable i. Next, in block 140, the edge cycle line equation for the edge cycle line segment defined by the two variables would be evaluated, as discussed below. It is significant that the logic will only reach block 140 if a pair of consecutive counterclockwise vertices are determined by the path line equation to have a first vertex that is negative and a second vertex that is either positive or equal to zero. Accordingly, the line represented by the path line equation is implicitly determined to have intersected a line segment of a front facing edge cycle, which is defined by consecutive vertices. The determination of the line equation for the intersected line segment is presented in the discussion of Theorem 2 below.

Theorem 2

$V(X_{iSRC},Y_{iSRC})$, $W(X_{iDST},Y_{iDST})$ are the first and second endpoints of an edge cycle line segment intersected by the line represented by the path line equation ($AX+BY+C=0$), respectively:

$$Y_{iDST} - Y_{iSRC} = M(X_{iDST} - X_{iSRC}), M = \frac{Y_{iDST} - Y_{iSRC}}{X_{iDST} - X_{iSRC}}$$

$$Y - Y_{iSRC} = \left(\frac{Y_{iDST} - Y_{iSRC}}{X_{iDST} - X_{iSRC}}\right) X - X_{iSRC}$$

$$(Y_{iDST} - Y_{iSRC})X + (X_{iDST} - X_{iSRC})Y + (X_{iDST}Y_{iSRC} - X_{iSRC}Y_{iDST}) = 0$$

∴ $A'=(Y_{iDST}-Y_{iSRC})$, $B'=(X_{iDST}-X_{iSRC})$, $C'=(X_{iDST}Y_{iSRC}-X_{iSRC}Y_{iDST})$ for $A'X+B'Y+C'=0$ which defines a transcendental line equation for the intersected edge cycle line segment.

Once the edge cycle line equation is determined, the logic moves to a block 142, and two calculations are made for the edge cycle line equation $\{(S'_p=A'X_p+B'Y_p+C'), (S'_q=A'X_q+B'_q+C')\}$ with the two endpoints $\{P=(X_p,Y_p), Q=(X_q,Y_q)\}$ that define the path line segment. The logic then advances to a decision block 144 where the signs of the two calculated values of the edge cycle line equation ($S'_p$, $S'_q$) are compared. If the signs of the two values are the same (plus/plus or minus/minus), the logic returns to block 118 so that the remaining vertices may be calculated with the path line equation. In this case, although the preferred embodiment of the present invention previously determined that the path line equation crossed the edge cycle line segment, the second endpoint Q of the path line segment was found to be outside the edge cycle during the current time interval. However, if the determination at decision block 144 is found to be true, the second endpoint of the path line segment is found to be inside the edge cycle and thus, the moving object will contact the edge cycle line segment during the current time interval.

The present invention has performed no more than four multiplication steps for each edge cycle line segment in order to determine if the moving object has collided with the segment and its vertices during the current frame rendering interval. Significantly, the present invention has been shown in practice to average approximately two multiplication steps for determining if a moving object has collided with each line segment of an edge cycle. Although the collision of the moving object with the edge cycle may have been determined at this juncture in the logic flow, the preferred embodiment can also provide additional information that more clearly defines the collision. As shown in a block 146 in FIG. 4, a determinant is employed to simultaneously solve the path and edge cycle line equations, so that the exact point of intersection ($X_{cross}$, $Y_{cross}$) may be determined as shown in Theorem 3 below.

Theorem 3

$$AX + BY + C = 0$$

$$A'X + B'Y + C' = 0$$

$$\begin{bmatrix} A & B \\ A' & B' \end{bmatrix}\begin{bmatrix} X \\ Y \end{bmatrix} = \begin{bmatrix} -C \\ -C' \end{bmatrix}$$

$$\begin{bmatrix} X \\ Y \end{bmatrix} = \begin{bmatrix} B' & -B \\ -A' & A \end{bmatrix}\begin{bmatrix} -C \\ -C' \end{bmatrix} \cdot \frac{1}{AB' - A'B}$$

$$X_{cross} = \frac{BC' - B'C}{AB' - A'B}, Y_{cross} = \frac{A'C - AC'}{AB' - A'C}$$

Once the intersection (cross) point is determined, the logic moves to a block 148 and either coordinate of the point ($X_{cross}$ or $Y_{cross}$) is employed to determine the exact time (t) of the collision between the moving object and the edge cycle as shown in Theorem 4 below.

Theorem 4

$$X_1 = X_0 + tV_x, Y_1 = Y_0 + tV_y, \quad \begin{aligned} V_x &= \text{Velocity in } x \text{ direction} \\ V_y &= \text{Velocity in } y \text{ direction} \end{aligned}$$

$$\text{For } X_1 = X_{cross}, t = \frac{\left(\frac{BC' - B'C}{AB' - A'B} - X_0\right)}{V_x};$$

$$\text{For } Y_1 = Y_{cross}, t = \frac{\left(\frac{A'C - AC'}{AB' - A'C} - Y_0\right)}{V_y}$$

The time (t) of the collision may be determined from either of the above Equations.

After determining the value of the time of intersection, the logic moves to a decision block 150 so that the computed convexity of the edge cycle may be evaluated. An edge cycle is convex when every internal angle has a value less than 180°. If the edge cycle is found to be convex, the logic moves to an end block and the logic is complete for this time interval. However, if the edge cycle is determined not to be convex (i.e., to be concave), the logic returns to block 118, and the remainder of the undetermined vertices are evaluated with the path line equation. In this way, each vertex of the non-convex edge cycle will be evaluated with the path line equation so that any multiple intersection points of the moving object with the edge cycle may be determined. Optionally, the procedure may compare the height (z-axis) of the moving 3D object and the height of the non-moving 3D object to determine if the moving object has passed under or over the non-moving object.

Figure 5:
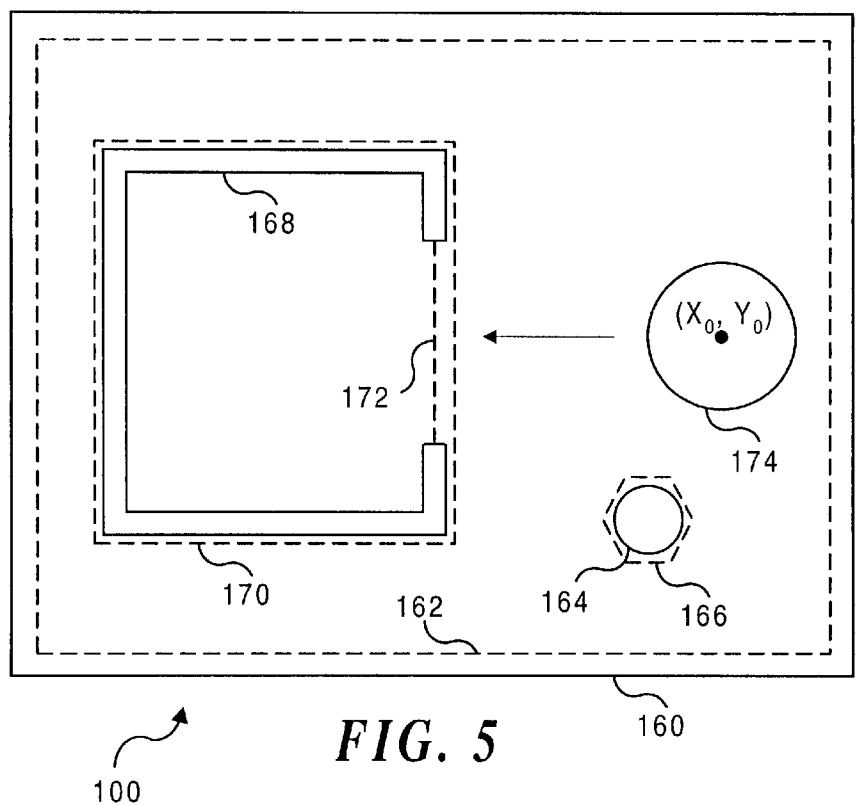
FIG. 5 is a plan view of a moving object and an area of interest that includes non-moving objects that are encircled by edge cycles.

In FIG. 5, a plan view 100 of a 2D virtual world is shown having a moving object 174 within a room 160 that has an edge cycle 162 that encircles the inner surface of the room. A non-moving object 164 is encircled by a convex edge cycle 166 that comprises six connected line segments. An enclosure 168 is disposed within room 160, and the enclosure has an edge cycle 170 that encircles the inner surface of the enclosure. Also, enclosure 168 has another edge cycle 172 disposed across an opening (portal) of the enclosure. As discussed in detail above, a collision of object 174 with an edge cycle is identified when the center point ($X_0,Y_0$) of the moving object intersects an edge cycle line segment. Additionally, edge cycles are only provided for the items within the 2D virtual world that are within an "area of interest" relative to moving object 174, i.e., only items that are in close proximity to the moving object. Thus, edge cycles need only be determined in the area of interest for the moving object so that computational resources may be optimized.

Figure 6:
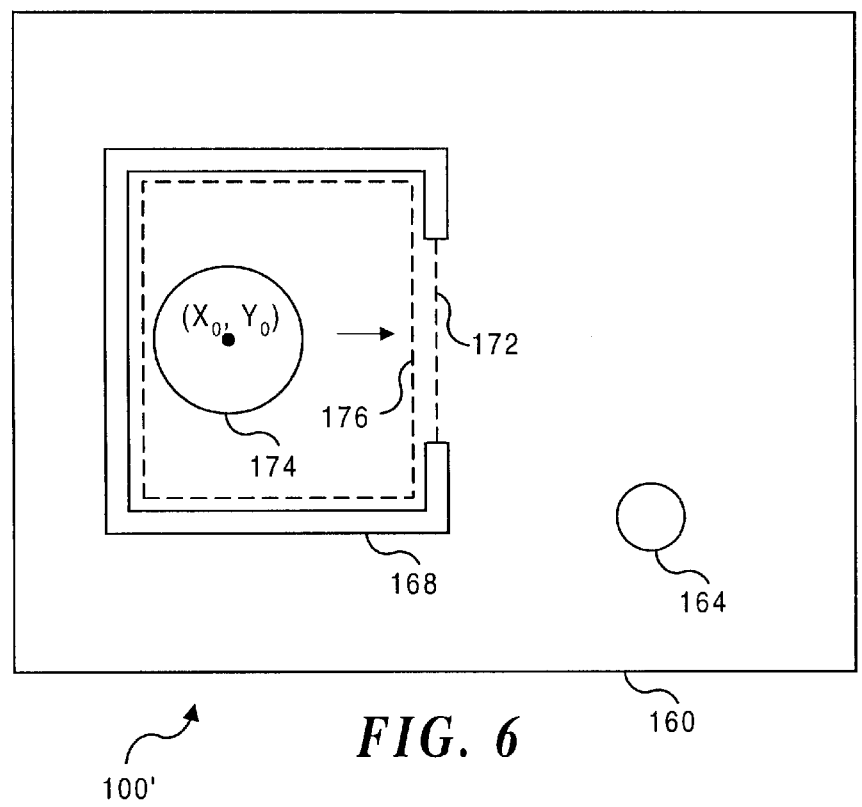
FIG. 6 is a plan view of a moving object in a room that has an edge cycle along the inner wall of the room.

In FIG. 6, another plan view 100' is shown of the 2D virtual world after object 174 has moved inside enclosure 168. Significantly, the area of interest for determining edge cycles has changed to reflect the new position of object 174. Consequently, the interior surface of enclosure 168 has an edge cycle 176, and the portal of the enclosure has an edge cycle 172. However, edge cycles are not needed outside enclosure 168 relative to object 174.

Figure 7:
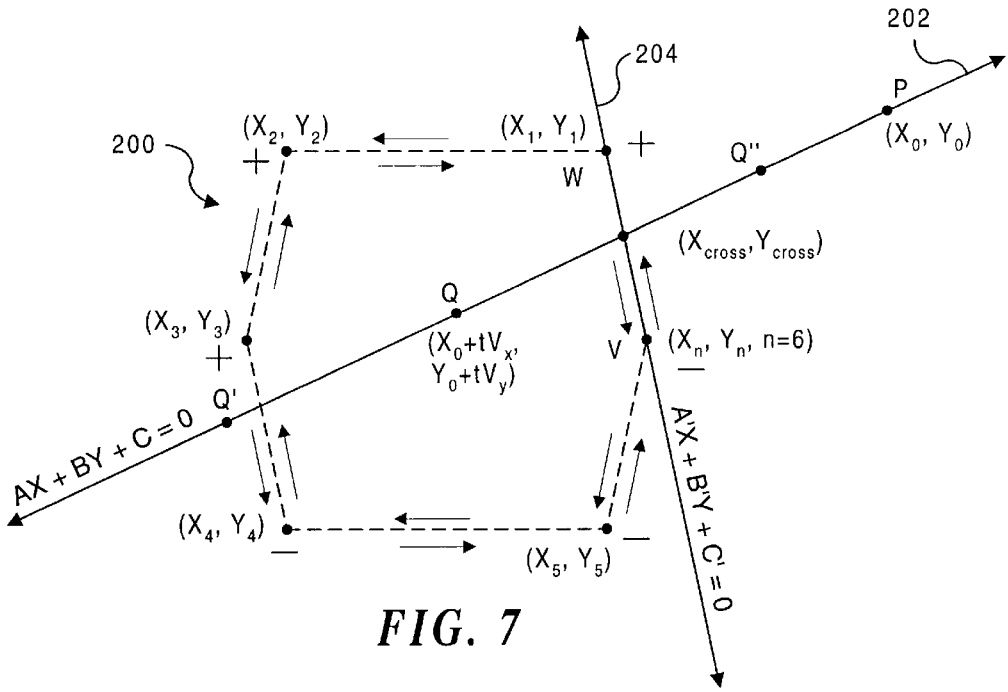
FIG. 7 is plan view of a line represented by a path line equation intersecting a convex edge cycle.

In FIG. 7, a convex edge cycle 200 is shown. The edge cycle comprises six line segments that are sequentially coupled together. A path line segment is defined by the initial disposition of the center point of a moving object $\{P=(X_0, Y_0)\}$ and another point, Q, along that path at which the center point of the object will arrive at time t, as defined as a function of the velocity of the object, V, by $\{Q=(X_0+tV_x, Y_0+tV_y)\}$. The two endpoints (P,Q) of a path line segment are disposed along a path line 202 in 2D space, which is defined by a path line equation (AX+BY+C=0). The outside of convex edge cycle 200 is defined as the front facing side because the center point of the moving object is initially disposed outside the 2D space enclosed by the edge cycle. Consequently, the outside (front facing) edge cycle vertices are ordered in a counterclockwise direction and the inside (back facing) edge cycle vertices have a clockwise order. The sequential order of the vertices for the front facing and the back facing sides of edge cycle 200 is indicated by a plurality of arrows disposed outside and inside the edge cycle, respectively.

Three different cases are illustrated by the three locations for endpoints (Q, Q', Q") of the path line segment along path line 202. Although the third case (the path line segment between points P,Q") does not intersect the edge cycle, the first two cases {for the points (P,Q), (P,Q')} each are path line segments that intersect a front facing edge cycle line segment $\{V=(X_6,Y_6), W=(X_1,Y_1)\}$. An edge cycle line equation (A'X+B'Y+C'=0) employs the edge cycle line segment endpoints (V, W) that define an edge cycle line 204 intersected by path line 202. Using the procedure discussed above, the values of vertices disposed above path line 202 $\{(X_1,Y_1), (X_2,Y_2), (X_3,Y_3)\}$ are found to be positive, and the values of vertices positioned below the path line $\{(X_4, Y_4), (X_5,Y_5), (X_6,Y_6)\}$ are found to be negative. Also, path line 202 intersects edge cycle line 204 at a crossing point $(X_{cross}, Y_{cross})$ It is important to note that a convex edge cycle can only have one intersection between a front facing edge cycle line and the path line of a moving object. Thus, once an intersection is found between the path of a moving object and a front facing line segment of a convex edge cycle, the present invention does not check the remainder of front facing line segments for intersections.

Figure 8:
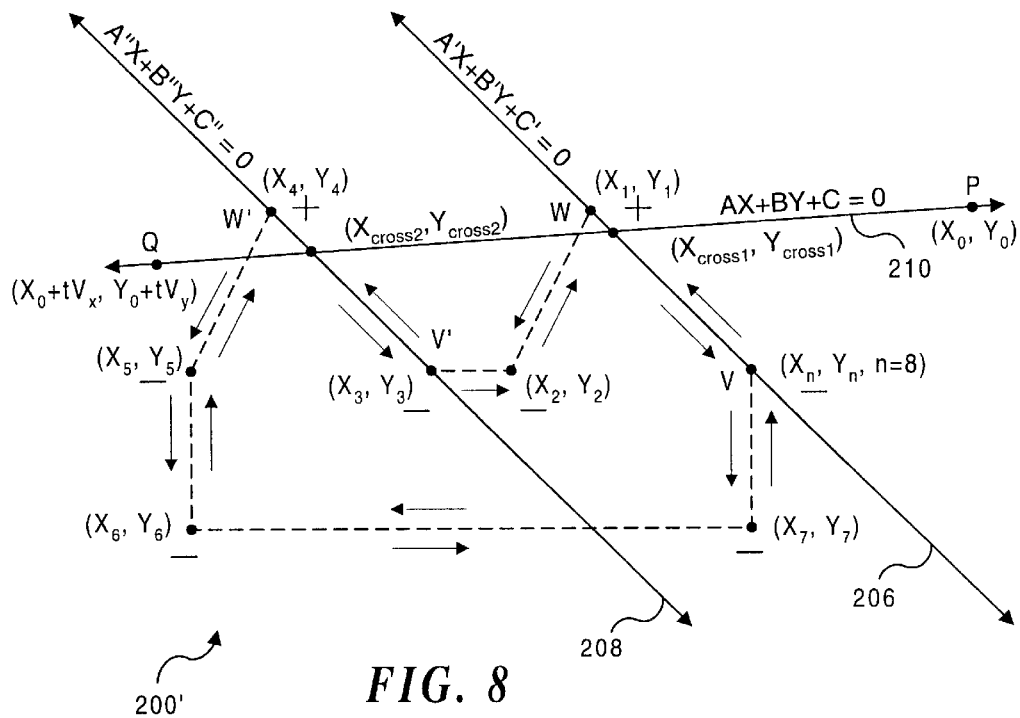
FIG. 8 is a plan view of the line represented by the path line equation intersecting a non-convex edge cycle.

In FIG. 8, a non-convex edge cycle 200' is shown. The edge cycle comprises eight line segments of differing lengths that are sequentially coupled together. A path line segment is defined by an initial point $\{P=(X_0,Y_0)\}$ and a subsequent point $\{Q=(X_0+tV_x,Y_0+tV_y)\}$, after time t, defining the disposition of the center of a moving object. The object is moving generally from outside the 2D space enclosed by edge cycle 200' and towards the interior of the edge cycle. These two points are thus endpoints (P,Q) of the path line segment having a path line 210 defined by a path line equation (AX+BY+C=0). The path line equation defines path line 210 in 2D space, indicating the direction of the object's movement.

Path line 210 intersects two front facing edge cycle line segments $\{(V=(X_6,Y_6), W=(X_1,Y_1)), (V'=(X_3,Y_3), W'=(X_4, Y_4))\}$. An edge cycle line equation (A'X+B'Y+C'=0) defines a first edge cycle line 206 in 2D space for the first edge cycle line segment (V, W) intersected by path line 210, and another edge cycle line equation (A"X+B"Y+C"=0) defines a second edge cycle line 208 in 2D space for the second edge cycle line segment (V', W') that is intersected. Path line 210 intersects non-convex edge cycle 200' at two crossing points $\{(X_{cross},Y_{cross}), (X_{cross},Y_{cross})\}$. Additionally, the sequential order of the vertices for the front facing and the back facing sides of edge cycle 200' is indicated by a plurality of arrows disposed, respectively, outside and inside the edge cycle. Moreover, since a path line for a moving object may have a plurality of intersections with a non-convex edge cycle, the present invention checks each front facing side of the edge cycle line segment to detect every intersection with the path of the moving object.

Figure 9:
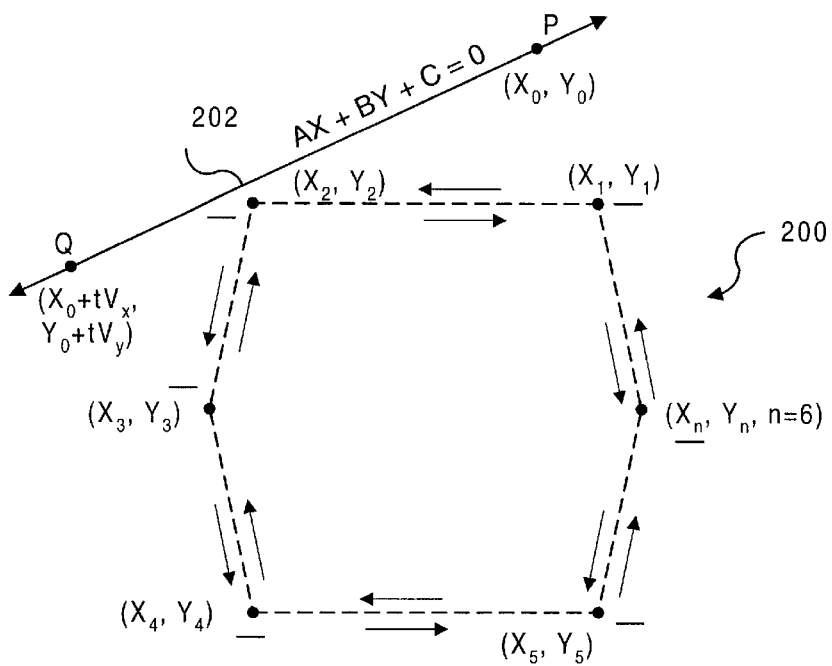
FIG. 9 is a plan view of the line represented by the path line equation passing above a convex edge cycle.
Figure 10:
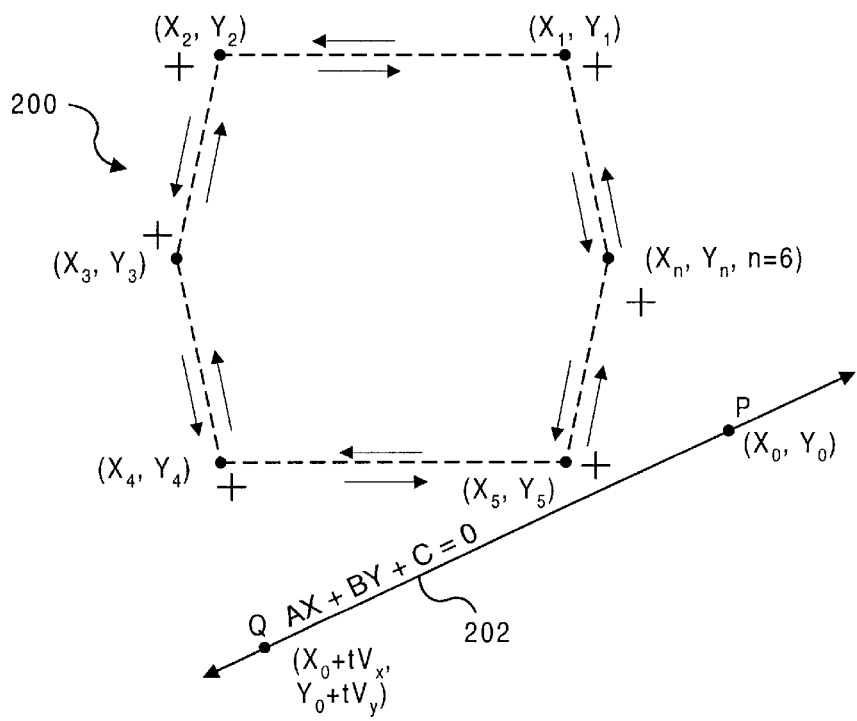
FIG. 10 is a plan view of the line represented by the path line equation passing below a convex edge cycle.

As shown in FIG. 9, the path line equation (AX+BY+C=0) and path line 202 that it defines are disposed above convex edge cycle 200 in 2D space. Significantly, the values for every vertex of the edge cycle are determined to be negative by the present invention. In contrast, FIG. 10 illustrates path line 202 disposed below convex edge cycle 200 in 2D space; and the value for all of the vertices in this example is determined by the present invention to be positive.

Figure 11:
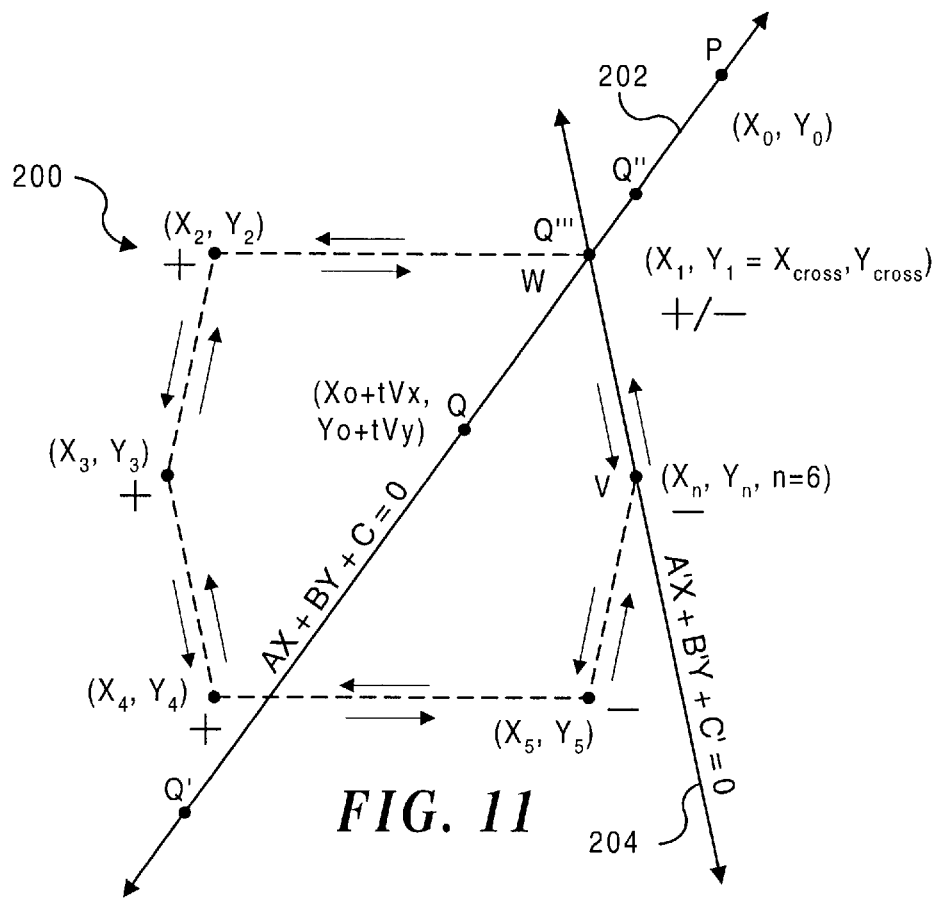
FIG. 11 is a plan view of the line represented by the path line equation intersecting a convex edge cycle by passing through a vertex formed by the endpoints of two line segments.

In FIG. 11, convex edge cycle 200 is again shown. Path line 202 defined by the path line equation (AX+BY+C=0) intersects edge cycle 200 initially at a first vertex $(X_1=X_{cross}, Y_1=Y_{cross})$ instead of intersecting an edge cycle line segment as discussed above. The value $(S_1=AX_1+BY_1+C)$ of the path line equation for the first vertex $(X_1, Y_1)$ should equal zero. However, the preferred embodiment of the present invention employs floating point math to determine values, and floating point math often does not produce an integer zero value, even though a result is nominally zero. Instead, floating point "drift" causes an extremely small number with a positive or negative value to be returned. Also, a special case may occur when the path line segment destination endpoint (Q') has the same coordinates as the vertex $(X_{cross}, Y_{cross})$ that is intersected by the path line. Since the present invention's floating point calculations may not yield a zero value, a symbol (+/-) is positioned adjacent to the intersected first vertex. The intersection between the path line segment and the edge cycle is evaluated with the sign calculated for the first vertex. If the sign is negative, the path line segment's intersection occurred with the first line segment $\{(X_1,Y_1), (X_2,Y_2)\}$. But if the first vertex's sign is positive, the path line segment will have intersected the sixth line segment $\{(X_6,Y_6), (X_1,Y_1)\}$. Unlike the prior art solutions, the present invention will always determine an intersection in this case.

Figure 12:
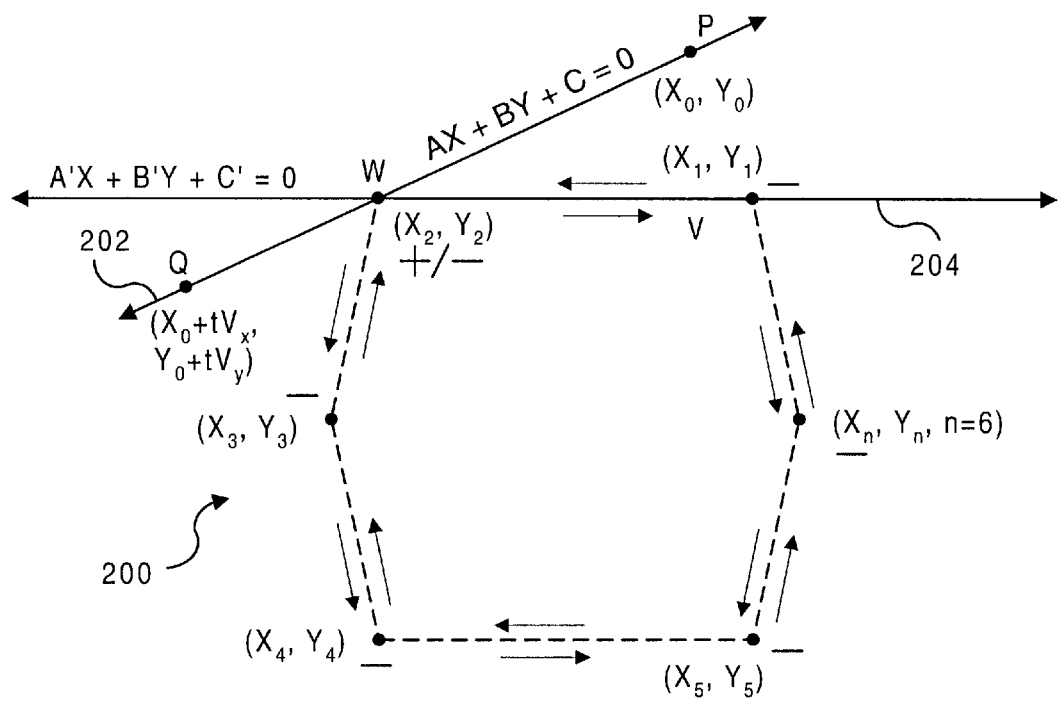
FIG. 12 is a plan view of the line formed by the path line equation intersecting a vertex formed by the endpoints of two line segments.

Looking now to FIG. 12, convex edge cycle 200 is again shown with path line 202 defined by the path line equation (AX+BY+C=0) passing solely through a vertex $(X_2,Y_2)$ of the edge cycle. As noted above, floating point calculations may cause the computed value of an intersected vertex to have either a positive or negative sign. In the instant case, the intersection will be detected if the path line equation employed by the present invention determines that the value of the intersected second vertex $(X_2, Y_2)$ has a positive sign. The path line segment intersects the second line segment $\{(X_1,Y_2), (X_2,Y_2)\}$ when the sign of the second vertex is positive; and the path line segment does not intersect the edge cycle when the sign of the second vertex is determined to be negative.

Figure 13:
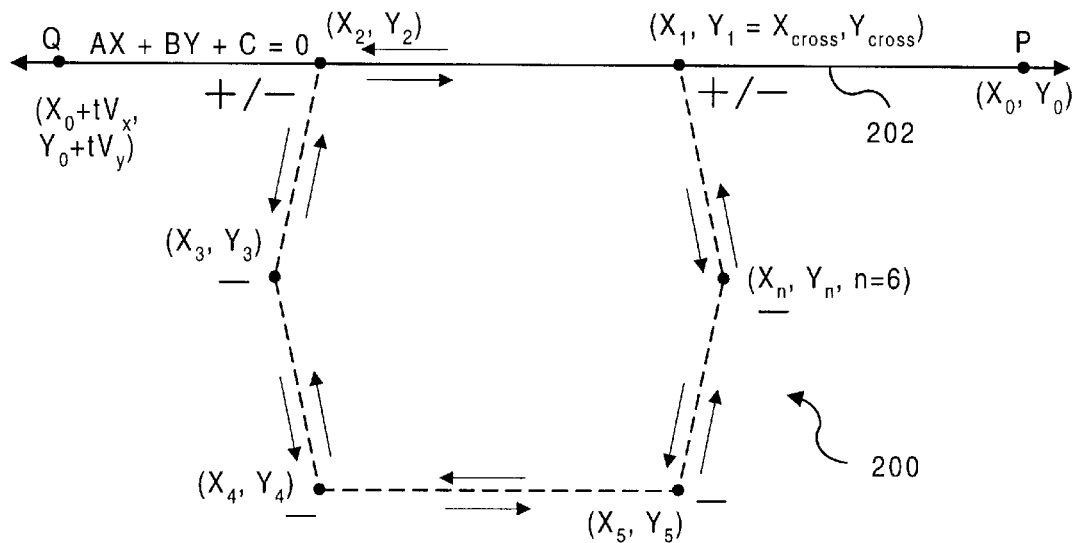
FIG. 13 is a plan view of the line represented by the path line equation disposed on top of a line segment that forms the upper boundary of a convex edge cycle.
Figure 14:
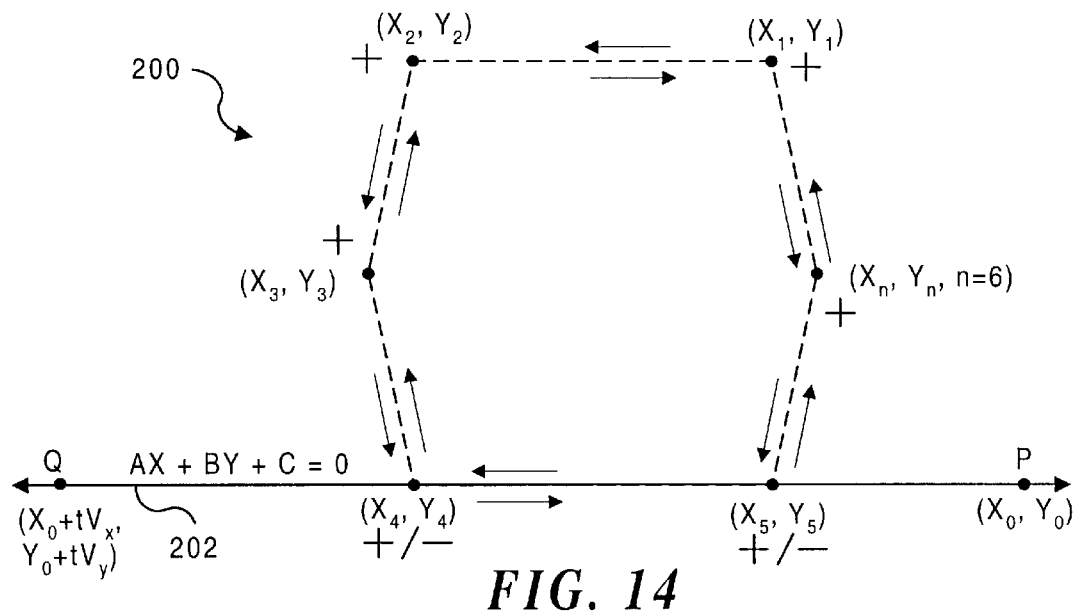
FIG. 14 is a plan view of the line represented by the path line equation disposed on top of a line segment that forms the lower boundary of a convex edge cycle.

In FIG. 13, convex edge cycle 200 is shown with path line 202 extending along an edge cycle line segment $\{(X_1, Y_1) (X_2, Y_2)\}$ that defines the upper boundary of the edge cycle. The collision will be detected if the present invention employs the path line equation for path line 202 to determine that the value of either of the intersected vertices $\{(X_1, Y_1), (X_2, Y_2)\}$ is positive. In FIG. 14, convex edge cycle 200 is shown with path line 202 positioned along the length of an edge cycle line segment $\{(X_4, Y_4) (X_5, Y_5)\}$. This edge cycle line segment is along the lower boundary of the edge cycle. The collision will be detected if the present invention uses the path line equation for path line 202 to determine that the value of either of the intersected vertices $\{(X_4, Y_4), (X_5, Y_5)\}$ is negative. In either case, floating point math imprecision typically does not preclude the present invention from detecting a collision.

Figure 15:
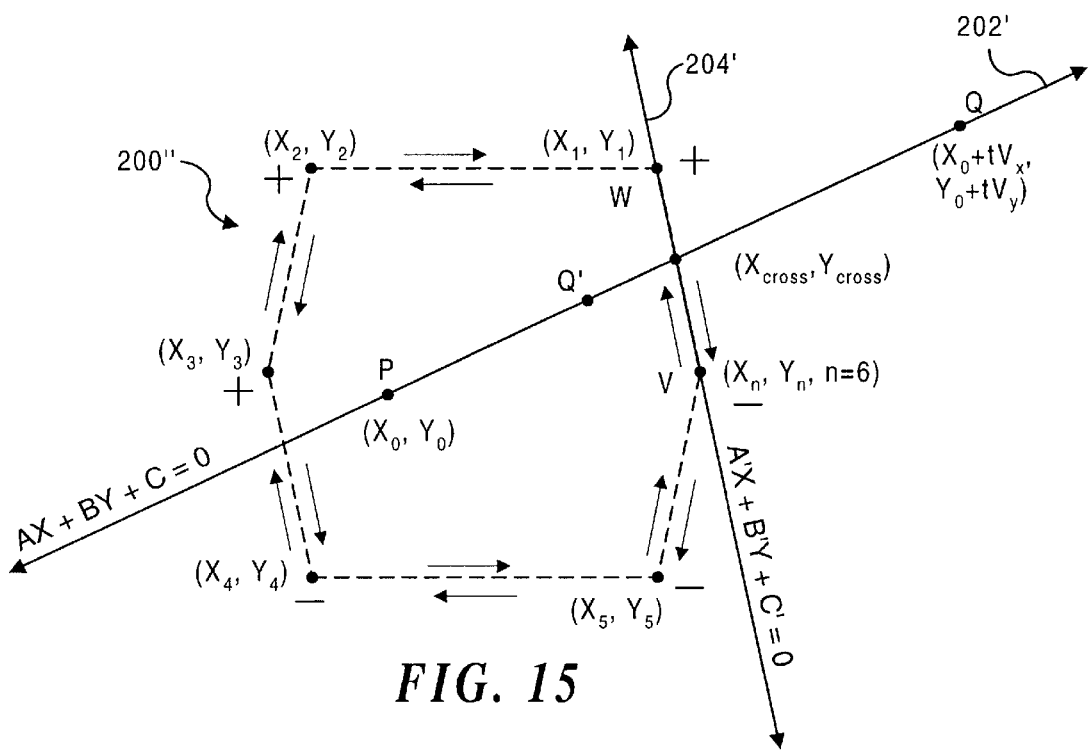
FIG. 15 is a plan view of the line formed by the path line equation intersecting a convex edge cycle.

In FIG. 15, illustrates the special case of a convex edge cycle 200" that is intersected by a moving object initially disposed within the 2D space enclosed by the edge cycle. The edge cycle comprises six line segments that are sequentially coupled together. A path line segment is defined by the initial disposition of the center point of the moving object $\{P=(X_0,Y_0)\}$ and its subsequent position $\{Q=(X_0+tV_x, Y_0+tV_y)\}$, after time t. The two endpoints (P,Q) of a path line segment are positioned along a path line 202' in 2D space, which is defined by the path line equation (AX+BY+C=0). Two different cases are illustrated by the two locations for the points (Q, Q') of the path line segment along the length of path line 202'. Although the second case (the path line segment for P, Q') does not intersect the edge cycle, the first case (the path line segment for P, Q) intersects a front facing edge cycle line segment $\{V=(X_6,Y_6), W=(X_1,Y_1)\}$. Significantly, the inner side of convex edge cycle 200' is defined as the front facing side because the center point of the moving object is initially disposed within the space enclosed by the edge cycle. The sequential order of the vertices for the front facing and the back facing sides of edge cycle 200' is indicated by a plurality of arrows disposed, respectively, outside and inside the edge cycle. Thus, the inner side (front facing) edge cycle vertices are ordered in a counterclockwise direction and the outer side (back facing) edge cycle vertices have a clockwise order.

Additionally, the edge cycle line equation (A'X+B'Y+C'=0) employs the edge cycle line segment endpoints (V, W) to define edge cycle line 204', which is intersected by path line 202'. Using the procedure discussed above, the values of vertices disposed above path line 202' $\{(X_1,Y_1), (X_2,Y_2), (X_3,Y_3)\}$ are found to be positive, and the values of vertices positioned below the line $\{(X_4,Y_4), (X_5,Y_5), (X_6,Y_6)\}$ are found to be negative. Also, the intersection of path line 202' with edge cycle line 204' occurs at a crossing point ($X_{cross}$, $Y_{cross}$).

Although the present invention has been described in connection with the preferred form of practicing it and various modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for detecting a collision between a first object that is moving and a second object, in a graphics environment effected with a computer, comprising the steps of:
   (a) extending a plurality of line segments in an ordered sequence, the ordered sequence of the line segments being joined at vertices that are ordered, forming an edge cycle around a projection of the second object onto a plane, each line segment being characterized as either back facing or front facing relative to the first object, as a function of a direction of the ordered sequence of the line segments around the projection;
   (b) projecting a path of the first object onto the plane as a path line segment extending in a direction along which the first object is moving and employing the path line segment to determine a path line equation that defines a path of the first object;
   (c) using the path line equation, classifying the vertices of the edge cycle to indicate a side of the path on which each vertex is disposed;
   (d) identifying any line segment of the edge cycle that is potentially intersected by the path line segment, by detecting consecutive vertices of the edge cycle that when classified, were found to be on different sides of the path;
   (e) for each said line segment that is potentially intersected by the path line segment, generating an edge cycle line equation; and
   (f) determining whether the path line segment actually intersects said line segment that is potentially intersected as a function of endpoints of the path line segment and of the edge cycle line equation, intersection of said line segment by the path line segment indicating that the first moving object has collided with the second object.

2. The method of claim 1, wherein the ordered sequence of the line segments is characterized as back facing if in a clockwise direction, and as front facing if in a counterclockwise direction.

3. The method of claim 1, further comprising the step of identifying any vertex of the edge cycle that is intersected by the path line segment, the value of the path line equation being equal to zero when said path line equation is evaluated for said vertex.

4. The method of claim 1, further comprising the step of determining whether the edge cycle is convex, a convex edge cycle having only internal angles between adjacent line segments that are less than 180 degrees.

5. The method of claim 1, further comprising the steps of:
   (a) determining sign values for a first endpoint and a second endpoint of the path line segment, using the edge cycle line equation;
   (b) classifying the sign values to be either opposite or equal to each other; and
   (c) determining that the path line segment intersects the line segment of the edge cycle when the pair of sign values are opposite to each other.

6. The method of claim 1, further comprising the step of storing the side of the path and coordinates for each vertex of the edge cycle that is classified.

7. The method of claim 1, wherein the step of classifying the vertices includes the step of identifying vertices that are disposed on one side of the path as having a positive value and vertices that are disposed on the other side of the path as having a negative value.

8. The method of claim 7, wherein the step of identifying comprises the step of evaluating the path line equation using a pair of consecutive vertices, a negative value being returned for a first vertex and a positive value for a second vertex of a line segment of the edge cycle that is potentially intersected by the path line segment.

9. The method of claim 7, wherein the step of classifying said vertices includes the step of identifying vertices that return a zero value when evaluated by the path line equation, each vertex that returns the zero value being intersected by the path.

10. The method of claim 9, further comprising the step of identifying a pair of consecutive vertices that return a negative value for a first vertex and a zero value for a second vertex when the first and the second vertices are evaluated with the path line equation, the first vertex and the second vertex being endpoints of a line segment of the edge cycle that is intersected by the path.

11. The method of claim 10, wherein each vertex of the edge cycle is classified only once.

12. The method of claim 1, further comprising the step of determining a cross point in the plane where the path line segment intersects the edge cycle.

13. The method of claim 12, wherein the path line equation and the edge cycle line equation are solved simultaneously to determine a set of coordinates in the plane for the cross point.

14. The method of claim 13, wherein the set of coordinates are employed to determine a time that the first object will collide with the second object.

15. The method of claim 1, further comprising the steps of:
(a) determining a first set of coordinates for the first object in a direction perpendicular to the plane;
(b) determining a second set of coordinates for the second object in the direction perpendicular to the plane; and
(c) comparing said first set and said second set of coordinates to determine whether the first object can collide with the second object.

16. The method of claim 1, further comprising the step of enabling selection of a number of successive line segments that are employed to form the edge cycle.

17. The method of claim 1, wherein the graphical environment includes a virtual world environment that is implemented by the computer.

18. The method of claim 1, wherein the graphical environment includes a virtual world environment that is implemented with a plurality of interconnected computers.

19. The method of claim 18, wherein the plurality of interconnected computers are coupled together in a network that employs the Internet for communication.

20. A system for detecting a collision of a first object that is moving with a second object in a graphics environment, comprising:
(a) a processor;
(b) a display, coupled to the processor, for displaying the graphics environment that includes the first object and the second object; and
(c) a memory coupled to the processor, for storing machine instructions, said machine instructions causing the processor to implement a plurality of functions, including:
(i) extending a plurality of line segments in an ordered sequence, the ordered sequence of the line segments being joined at vertices that are ordered, forming an edge cycle around a projection of the second object onto a plane, each line segment being characterized as either back facing or front facing relative to the first object, as a function of a direction of the ordered sequence of the line segments around the projection;
(ii) projecting a path of the first object onto the plane along a path line segment extending in a direction along which the first object is moving and employing the path line segment to determine a path line equation that defines a path of the first object;
(iii) using the path line equation, classifying the vertices of the edge cycle to indicate a side of the path on which each vertex is disposed;
(iv) identifying any line segment of the edge cycle that is potentially intersected by the path line segment, by detecting consecutive vertices of the edge cycle that when classified, were found to be on different sides of the path;
(v) for each said line segment that is potentially intersected by the path line segment, generating an edge cycle line equation; and
(vi) determining whether the path line segment actually intersects said line segment that is potentially intersected as a function of endpoints of the path line segment and of the edge cycle line equation, intersection of said line segment by the path line segment indicating that the first moving object has collided with the second object.

21. An article of manufacture adapted for use with a computer, for detecting a collision of a first object that is moving with a second object in a graphics environment, comprising:
(a) a memory medium adapted to be used with the computer; and
(b) a plurality of machine instructions stored on the memory medium, said machine instructions, when executed by a computer, causing the computer to implement a plurality of functions, including:
(i) extending a plurality of joined straight line segments in an ordered sequence, said ordered sequence of line segments being joined at vertices that are ordered, forming a boundary of an edge cycle around an image of the second object on a planar surface, each edge cycle being characterized as either back facing or front facing relative to the first object as a function of a direction of the ordered sequence of the line segments;
(ii) projecting a path of the first object onto the planar surface as a path segment extending in a direction toward which the first object is moving and employing the path line segment to determine a path line equation for the path of the first object;
(iii) classifying the vertices of the edge cycle to indicate a side of the path line equation on which each vertex is disposed;
(iv) identifying an edge cycle line segment that crosses the path line equation by detecting consecutive vertices that when classified, were found to be on different sides of the path line equation, said consecutive vertices being disposed at opposite ends of a line segment of the edge cycle that potentially crosses the path line segment; and
(v) checking only each line segment of the edge cycle that is crossed by the path line equation and which is front facing to determine if the line segment of the edge cycle is actually crossed by the path line segment, indicating that the first object will thus collide with the second object.

* * * * *